United States Patent [19]

Kallenbach et al.

[11] Patent Number: 5,324,067
[45] Date of Patent: Jun. 28, 1994

[54] SYSTEM FOR GENERATING A SIGNAL ON A VEHICLE

[75] Inventors: Rainer Kallenbach, Waiblingen-Neustadt; Andrew-William Kingston, Schwieberdigen; Siegbert Schwab, Sindelfingen; Michael Wanner, Holzgerlingen, all of Fed. Rep. of Germany; Eberhardt Schunck, Farmington Hills, Mich.

[73] Assignee: Robert Bosch GmbH, Stuttgart, Fed. Rep. of Germany

[21] Appl. No.: 851,858

[22] Filed: Mar. 16, 1992

[30] Foreign Application Priority Data

Apr. 12, 1991 [DE] Fed. Rep. of Germany .... 4112004.3

[51] Int. Cl.$^5$ ............................................. B60G 17/015
[52] U.S. Cl. ..................................... 280/707; 188/299
[58] Field of Search ............... 280/707; 188/299, 317, 188/322.14, 322.15

[56] References Cited

U.S. PATENT DOCUMENTS

| | | | |
|---|---|---|---|
| 4,305,486 | 12/1981 | Cowan | 188/299 |
| 4,325,468 | 4/1982 | Siorek | 188/322.14 |
| 4,650,042 | 3/1987 | Knecht et al. | 188/299 |
| 4,861,483 | 10/1990 | Yamaoka | 188/299 |
| 4,887,699 | 12/1980 | Ivers et al. | 188/299 |
| 4,936,425 | 6/1990 | Boone et al. | 188/299 |
| 5,107,969 | 4/1992 | Klein et al. | 188/299 |
| 5,154,442 | 10/1992 | Milliken | 188/299 |

FOREIGN PATENT DOCUMENTS

| | | | |
|---|---|---|---|
| 163011 | 7/1986 | Japan | 280/707 |
| 2154700 | 9/1985 | United Kingdom | 180/299 |

OTHER PUBLICATIONS

Article from Vehicle System Dynamics Nov. (1982), pp. 31-42, author Donald L. Margolis, titled–Semi-Active Heave and Pitch Control for Ground Vehicles.

Primary Examiner—Karin L. Tyson
Attorney, Agent, or Firm—Baker & Daniels

[57] ABSTRACT

The damping characteristics of shock absorbers are variable contingent upon various operating parameters. In changing the damping characteristic, the invention provides for performing the change during operating phases of slight damping force changes. This can be achieved, in that the changes of the damping characteristic are carried out only in the compression stage of the shock absorber. This is especially favorable with a shock absorber of a design such that its damping characteristic will be adjustable only in the traction stage.

17 Claims, 4 Drawing Sheets

1. DESIRED CHANGEOVER
2. ACTUAL CHANGEOVER
3. SPRING DEFLECTION VELOCITY
4. DAMPER FORCE CHARACTERISTIC CURVES I
5. DAMPER FORCE CHARACTERISTIC CURVES II

SYSTEM FOR GENERATING A SIGNAL ON A VEHICLE

BACKGROUND OF THE INVENTION

The invention relates a system for generating a signal on a vehicle, specifically in conjunction with an undercarriage control.

An efficient suspension system between the wheel units and the vehicle superstructure is essential for the design of the undercarriage of a motor vehicle. In the case of a semiactive system, such a suspension system consists generally of a spring arrangement having a fixed spring characteristic with which a shock absorber device with adjustable damping is arranged in parallel thereto. Such a shock absorber with an adjustable characteristic may be realized in such a way that the shock absorber system is equipped with a flow control valve whose cross sectional flow is variable.

Furthermore, an efficient process for the control or regulation of the adjustable suspension system is of great importance for the design of such an undercarriage. Such a process, based on information from sensor signals which apprise the state of travel of the vehicle, provides activation signals for the adjustable suspension systems.

An efficient undercarriage regulation or control should ideally regulate or control the adjustable undercarriage in such a way that, for one, it allows for road safety and, for another, enables maximum travel comfort for the passengers and/or a vehicle cargo that is sensitive to shocks. From the aspect of the suspension and/or shock absorber system, these are conflicting objectives. High travel comfort can be achieved through a maximally soft undercarriage adjustment, whereas with regard to high road safety, a maximally hard undercarriage adjustment is desirable.

Previously known from DE-OS 39 18 735 is a process for damping sequences of motion on undercarriages of passenger cars and trucks. Here, the activation signals for control or regulation of the adjustable undercarriage are essentially generated by the processing of sensor signals through filter setups. These filters are so conceived that the sensor signals which apprise the travel state of the vehicle will be influenced in their amplitude and/or phase development. This influencing generates activation signals for the adjustable undercarriage, thereby effecting an adaptation to the respective state of movement of the vehicle in such a way that in critical travel situations an undercarriage adjustment serving the road safety mode will be brought about while in uncritical travel situations an adjustment for comfort will be made.

An undercarriage comfort adjustment can be accomplished in that the adjustable undercarriage is adjusted maximally soft, i.e., such that the adjustable shock absorbers exercise a slight damping. A far more efficient control or regulation of the undercarriage, for example in view of the movements of the vehicle superstructure that determine travel comfort, can be accomplished through a so-called frequency-dependent "skyhook regulation."

With the so-called skyhook regulation, the superstructure movements are reduced so as to bring about an improvement of the travel comfort, whereas the road safety is not directly increased. Generally known in undercarriage control, this concept of regulation is based on the model concept of a shock absorber and/or suspension system that attaches to the mass of the vehicle superstructure and is connected to an inertial fix point (skyhook). Such an inertial shock absorber and/or suspension system not being directly realizable in practice, is by way of substitution, appropriately activated between the vehicle superstructure and the wheel units.

There is known from a number of publications (Crolla, D. A., Aboul Nour, A. M. A., Proceedings of the Institution of Mechanical Engineers, International Conference of Advanced Suspension, 22–25 Oct. 1988, London or Magolis, D. L., Semi-Active Heave and Pitch Control for Ground Vehicles, Vehicle System Dynamics, 11 (1982), pp. 31–42), in the case of a suspension system featuring shock absorbers whose damping characteristic is adjustable in two stages (hard/soft), "semiactive, discrete skyhook damping" which is a switching strategy wherein the damping characteristic is adjusted contingent on superstructure movements. This strategy is presented in the following table:

|  | Shock absorber in pull state | Shock absorber in push state |
| --- | --- | --- |
| $Va > Vagr$ | hard | soft |
| $Va < -Vagr$ | soft | hard |

Here, the superstructure velocity in the vertical direction, at the points of attack of the suspension system, is abbreviated as $Va$. Once this velocity exceeds a certain positive bound $Vagr$ (tuning parameter), i.e., as an impetuous upward movement of the car body is taking place, the respective shock absorber is switched in the pull state to the hard characteristic, and in the push state to the soft characteristic. Conversely, an impetuous down movement of the superstructure causes in the pull stage, a changeover to the soft and in the push stage to the hard characteristic. In the absence of excessive superstructure movements ($|Va| \leq Vagr$) the shock absorber operates in its soft tuning mode, both in the pull and the push stage.

Shock absorbers that are adjustable in their damping characteristic are described in DE-OS 33 04 815 and DE-OS 36 44 447.

When activating the shock absorbers in the aforementioned manner, considerable switching noises may occur when changing the damping characteristic.

U.S. Pat. No. 4,936,425 proposes a system for undercarriage control where a changeover of a semiactive shock absorber between a hard and a soft damping stage is to be carried out when the relative velocity of the two shock absorber attachment points is smaller than a fixedly predetermined threshold or the tire deformation is smaller than a fixedly predetermined threshold, depending on which of these two switching conditions is met first. With such an activation dependent on shock absorber piston velocity an optimum activation mode is not achievable even when additionally allowing for the deformation of the tires as a criterion for changeover of the shock absorber characteristic. Furthermore, allowing for the tire deformation requires a considerable expense regarding the necessary sensor engineering.

The problem underlying the present inventional system is to develop an optimized activation system for activation of the shock absorbers.

This problem is solved through the inventional system with the features described hereinbelow.

SUMMARY OF THE INVENTION

The present inventional system for undercarriage control features at least one shock absorber whose one end is operationally connected, directly or indirectly, with the vehicle superstructure and the other end with at least one wheel unit. The damping characteristic of the shock absorbers is variable and contingent upon operating parameters. The operating parameters may be determined, for instance, based on superstructure movements or spring deflection movements determined by means of sensors, according to the skyhook law of regulation described above. The present invention further provides means for ensuring that a changeover of the damping characteristic will take place in operating phases of slight damping force changes. The changeover of the damping characteristic is generally associated with a transition of the damping force. For example, a transition from a soft damping characteristic to a hard one means a transition from a low damping force to a higher damping force produced by the shock absorber. The difference of the damping forces of the individual damping characteristics generally varies in various operating phases of the shock absorbers. Thus, the damping effect of the shock absorber increases with a rising operating speed of the piston contained in it. Operating phases of slight transitions of the damping force may thus be operating phases in which a low piston speed is on hand. Such an operating phase is concerned, for example at a change of mathematical sign of the shock absorber piston velocity.

As a motor vehicle travels across uneven roads, the springs in the suspension system of the motor vehicle compress and expand in order to absorb jolt. But with the springs continuing to swing until they finally return to their original state, the adherence to the road is reduced by these vibrations while at the same time the travel comfort suffers. For these reasons, shock absorbers are now used to reduce the spring vibrations in order to achieve a better adherence to the road and improve the travel comfort. To further increase the travel comfort, a shock absorber is generally equipped to have a damping effect that is greater in extending (traction stage) than it is in retracting (compression stage). With such shock absorbers, operating phases of slight damping force changes, are thus always on hand in the compression stage. A favorable embodiment of the present inventional system consists in carrying changeovers of the damping characteristic out only as the two ends of the shock absorber approach each other (compression stage). Furthermore, provisions ma be such that the changeovers of the damping characteristic will be performed at the reversal points of the relative movements, especially at the reversal points after which the two ends of the shock absorber move toward each other (compression stage). The reversal points of the relative movements may be captured, by detecting the mathematical sign change of the spring deflection velocity.

Provided as a further favorable embodiment of the present inventional system is a shock absorber of a design such that its damping characteristic is laid out to be adjustable as the two ends of the shock absorber move away from each other (traction stage).

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
FIG. 1 is a diagram showing various relationships contingent upon the vertical superstructure movement.
Figure 1:
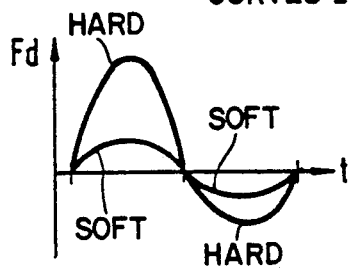
Figure 1:
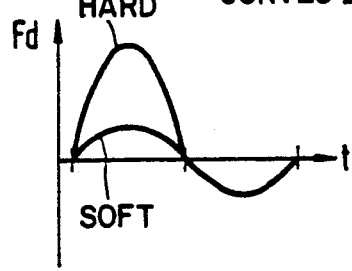

Corresponding reference characters indicate corresponding parts throughout the several views. The exemplifications set out herein illustrate a preferred embodiment of the invention, in one form thereof, and such exemplifications are not to be construed as limiting the scope of the invention in any manner.

DESCRIPTION OF THE PREFERRED EMBODIMENT

In this embodiment, the mode of operation of the inventional system will be illustrated with the aid of the figures.

Figure 2:
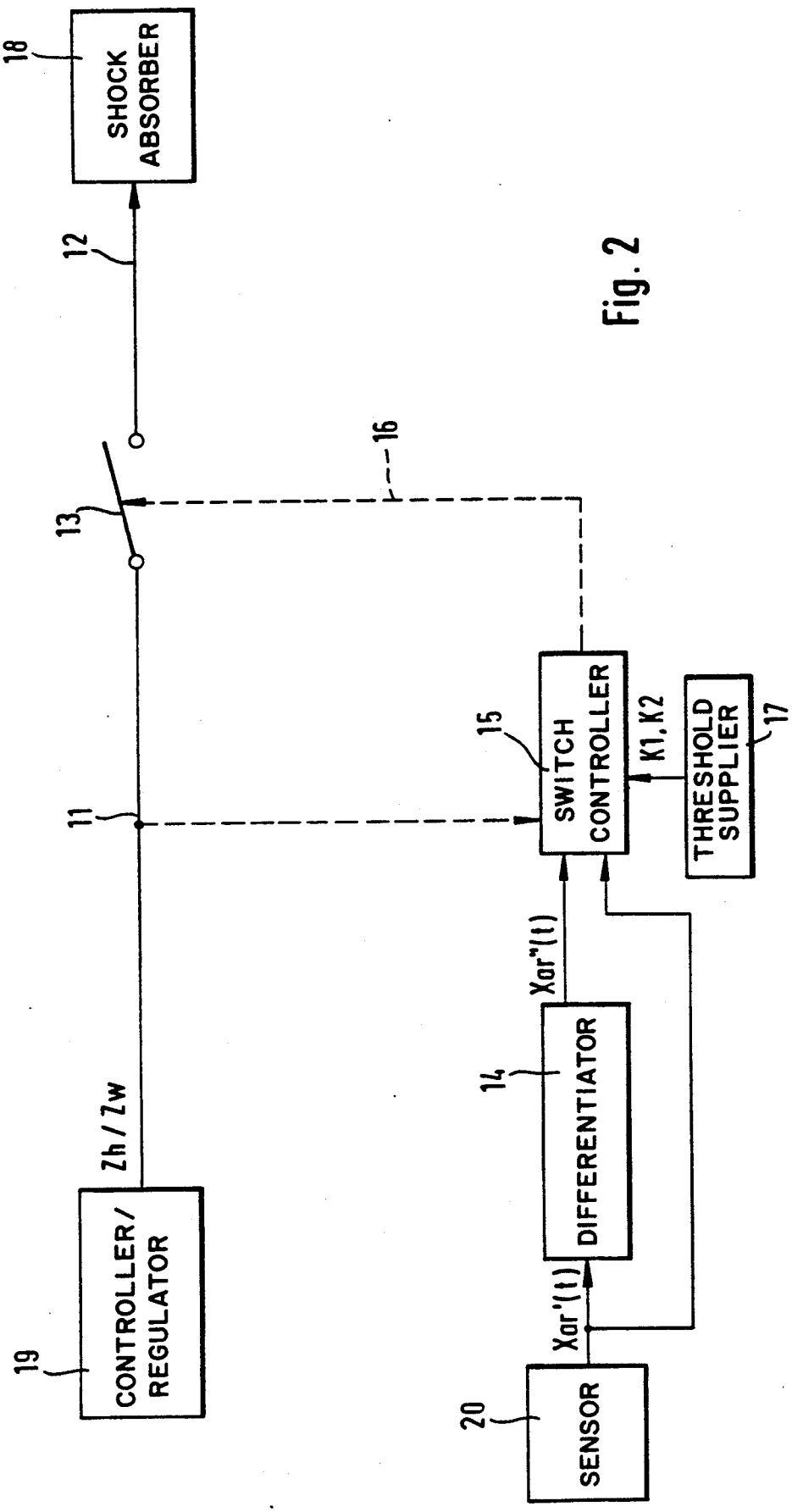
FIG. 2 shows a block diagram of a preferred embodiment of the present invention.

FIG. 2 shows a block diagram of the present inventional system. Based on the means 19, the signal path 11 is controllably connected with the signal path 12 by means of the controllable switch 13. Based on means 20, a signal $X_{ar}'(t)$ is relayed to the first means 14 and second means 15. The output signal of the first means 14 is transmitted to the second means 15. Further signals prevail in the second means 15, wherein the output signal of the second means 15 is passed on to the controllable switch 13 by means of the signal path 16. Referenced 18 is a shock absorber.

Figure 4:
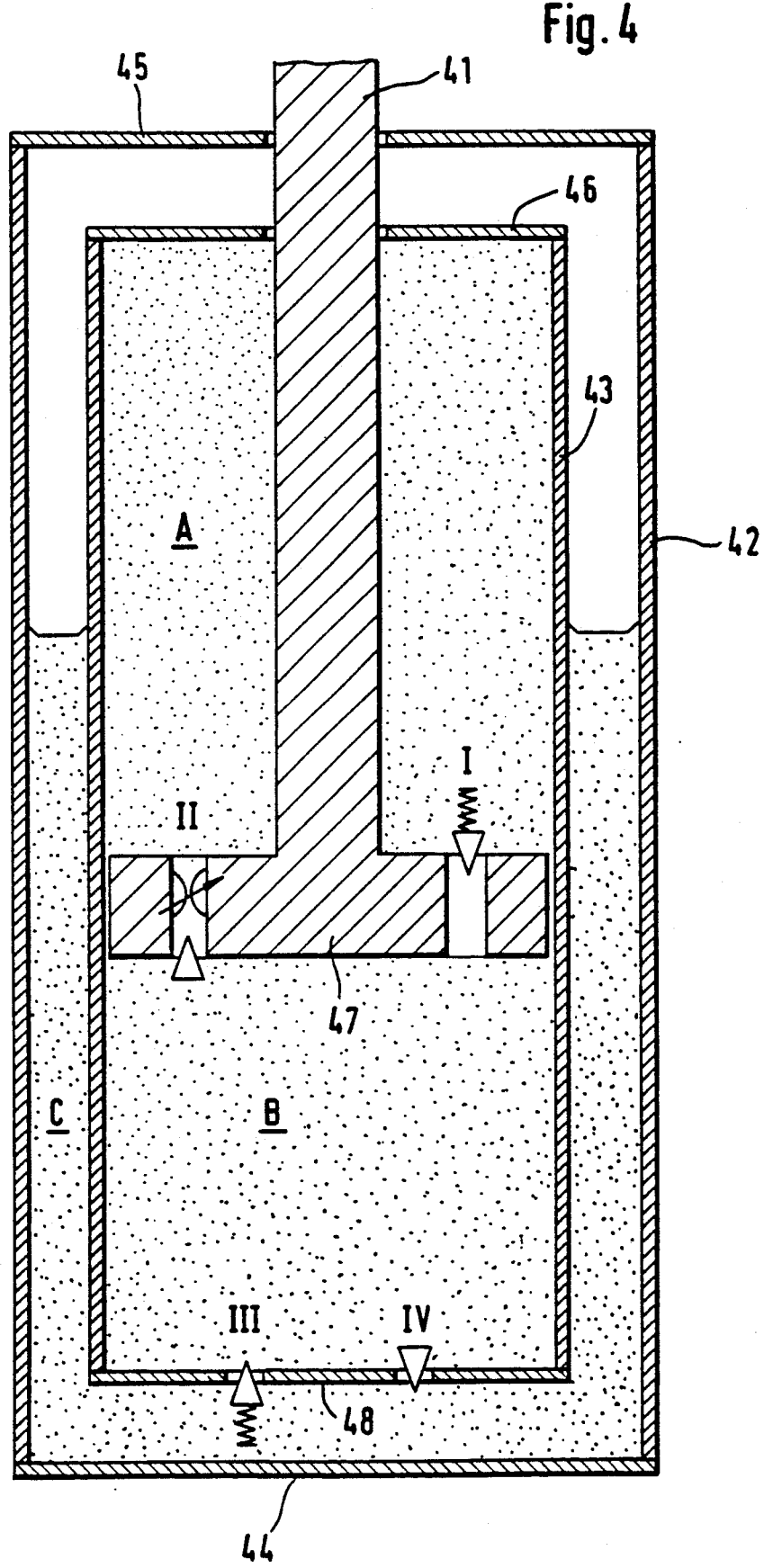
FIG. 4 shows the structure of an exemplary shock absorber.

FIG. 4 shows the structure of a shock absorber. Referenced 43 is an inner shell tube, while an outer shell tube is referenced 42. References 44 and 48 represent bottoms, references 45 and 46 represent lids. Marked 41 is a piston rod while 47 marks a damping piston. References A, B and C represent working chambers, references I, II, III and IV are recesses designed as valves.

The problematic nature of shock absorber activations will be illustrated hereafter on the example of a skyhook regulation, with the aid of FIG. 1. The changeover of the damping characteristic is carried out in two stages, that is, the shock absorbers designed to be adjustable in their damping characteristic have a hard and a soft adjustment. But the present inventional system is not limited to the activation mode of such shock absorbers adjustable in two stages, since the problem underlying the inventional system, specifically in view of the noise optimization in the course of changeover procedures, is also solved by the inventional system in the case of shock absorbers that are adjustable in multiple stages or continuously adjustable. Furthermore, the present inventional system is not limited to a specific strategy of regulation, but any adjustment requirements on the shock absorbers may be influenced in terms of time according to the invention.

Schematically illustrated in the upper portion of FIG. 1, are the two possible vertical superstructure movements of a vehicle. For simplification, a strictly lifting movement of the vehicle superstructure is assumed here. In the case of collective superstructure movements, such as roll and pitch movements of the vehicle superstructure, the skyhook strategy of regulation is applied at the attachment points of the shock absorbers, separately for each shock absorber, contingent on the local superstructure movement.

If the vehicle superstructure is in an upward movement, the shock absorbers are set to either soft or to hard, independent of the spring deflection velocity. If the spring deflection is positive (traction stage, by convention), a hard shock absorber adjustment is desired so as to counteract the upward movement of the vehicle superstructure. In the compression stage of the shock absorber (spring deflection velocity negative, by convention), a soft shock absorber adjustment is desired so as to counteract the upward movement of the vehicle superstructure in a minimizing fashion. Analogous thoughts apply in the case of a downward movement of the vehicle superstructure as illustrated in the right-hand column.

Ideally, as shown in line 1 of FIG. 1, the changeovers of the damping characteristics should thus always occur in the range of the zero passages of the spring deflection velocity. The spring deflection velocity can be seen in line 3, FIG. 1. But such an ideal changeover can be realized only with difficulty because the response time of the controlled system is so long that the actual valve changeover may take place late, by up to a quarter cycle of the spring deflection velocity signals. The response time depends for instance on the computer running time and the shock absorber dynamics. Depicted in line 2, FIG. 1, is the actual changeover conditioned thereby. Hence, the actual changeovers occur late for the above reasons by a quarter cycle.

Illustrated in the 4th line of FIG. 1, left-hand column, are typical damping force curves. The damping force Fd is plotted over the time t. The shock absorber characterized by the damping force curves I (line 4, FIG. 1) always features a soft and a hard adjustment in the traction and in the compression stage. The damping force changes caused by the actual changeovers (line 2) can be seen in the two right-hand diagrams of line 4. It is evident that the damping force changes caused by the actual changeovers, especially in the traction stage, are large. The relatively large damping force changes during the changeovers, specifically in the traction change, create noise problems when changing the damping characteristics. Furthermore, the actual changeovers reduce the regulating effect of the skyhook regulation, since the damping force to be produced by the shock absorber sets in only with a delay.

A first embodiment of the inventional system provides for performing, with a damping force curve I as shown in the left column of line 4, changeovers of the damping characteristic only when the shock absorber is in its compression phase. Achieved thereby is an improvement regarding the changeover noises, because in the compression phase there are generally lower damping force differences to be expected than in the traction stage. Furthermore, a changeover in the compression stage allows the expectation of an improved regulating effect regarding the minimization of the superstructure movements, since the traction stage range, with its relatively large damping force changes, is being fully utilized.

A further embodiment of the inventional system is based on the damping force line II in the left-hand column of line 5. In reviewing the damping curve II it is evident that with this shock absorber a soft and a hard damping characteristic is present only in the traction stage, whereas no adjustment of the damping characteristic is possible in the compression stage. When, in the case of a shock absorber with a damping force curve II providing for activations aiming to change the damping characteristic merely in the compression stage, the two diagrams illustrated in the right-hand part of line 5 will be the result. Since with this embodiment the changeovers of the damping characteristic take place only in the operating phase in which just a single curve exists, no damping force changes, will occur consequently in the changeovers. Such a system is optimized in terms of noise and regulating effect.

In summary, it can thus be said that the following advantages can be achieved by effecting the changeover of the damping characteristic only in the compression stage:

1. Noise problems are avoided because the varying internal shock absorber pressure between hard/soft is always low in the compression stage.
2. The time duration in which the shock absorber typically is in the compression stage provides sufficient time in view of the regulator response time.
3. The typical force in the compression stage is low as compared to that in the traction stage, and the regulator deterioration is small when the compression stage is not fully utilized. Contrarily, in view of the regulator response time, it might be better to have a regulator which fully utilizes the traction stage without allowing for the compression stage, rather than trying to fully utilize both stages.
4. A longer service life of the shock absorber is to be expected because, for one, the switching frequency is lower and, for another, the valve changeovers occur at a low differential pressure.
5. To be described hereinbelow, a shock absorber may be so developed that it is adjustable with regard to its damping characteristic only in the traction stage. This shock absorber is characterized by simple switching valves and thus can be cost-effectively realized.

Figure 3:
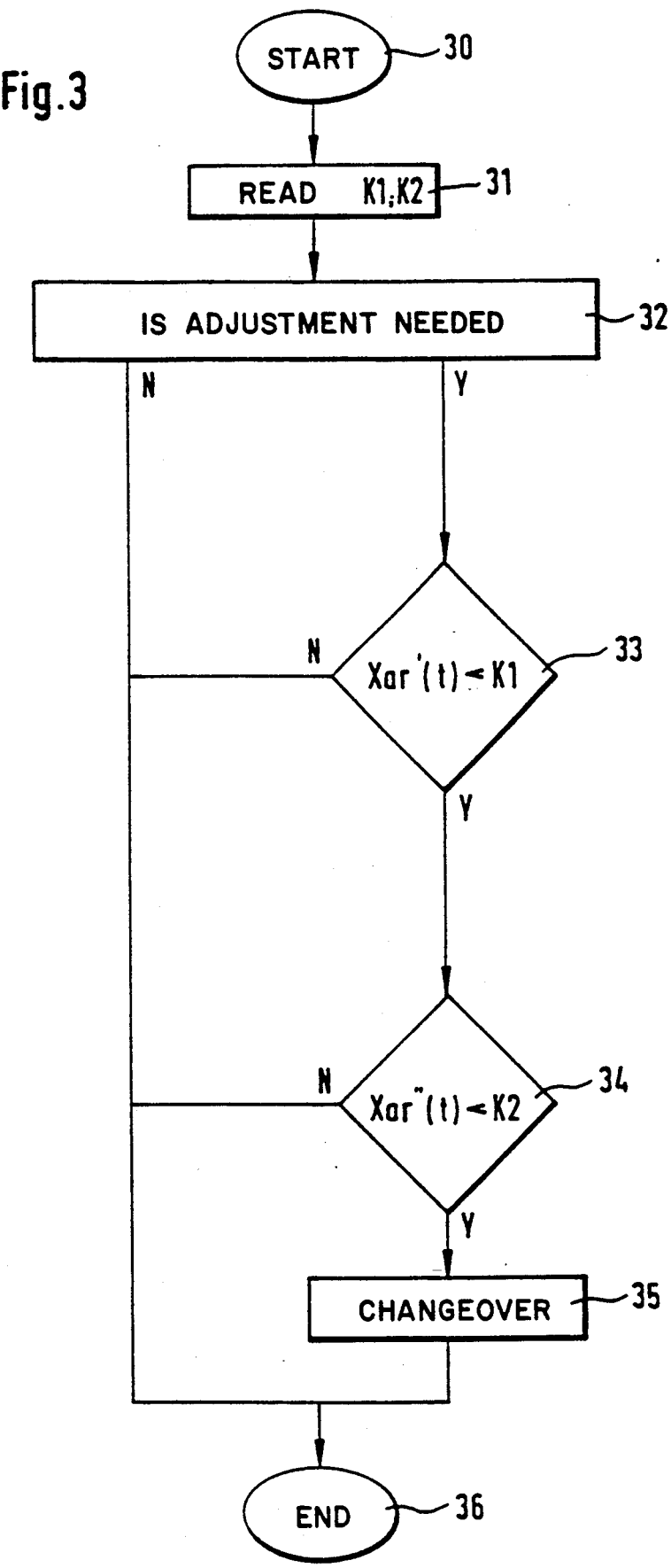
FIG. 3 is a flow chart of the present invention.

FIG. 2 and 3 will now describe the present inventional system in exemplary fashion. The traction stage demand Zh (desired hard adjustment in the traction stage) or Zw (desired soft adjustment in the traction stage) prevails as an output signal from means 19 which, based on sensed vehicle movements, provide activation signals for the shock absorbers. Underlying the functional mode of means 19, for example, may be the skyhook regulating strategy described above. The traction stage demands Zw/Zh are relayed to a controllable switch 13 by means of the signal path 11. The controllable switch (13) can connect the signal path 11 with the signal path 12, the latter passing an activation signal on to the shock absorber referenced 18. The controllable switch 13 is actuated dependent on the output signals of the second means 15. For that purpose, a signal for the spring deflection acceleration $Xar''(t)$ is determined in first means 14, from the signal $Xar'(t)$, which represents the spring deflection velocity. The signals $Xar'(t)$ are captured in means 20, by appropriately processing for instance sensor signals from a spring deflection path, and/or spring deflection velocity sensors, and/or damper pressure sensors. The signals $Xar'(t)$ of the spring deflection velocity and spring deflection acceleration are passed on to the second means 15. Thus, the first means 14 feature a differentiating transfer performance. Furthermore, signals K1 and K2 are transmitted to the second means 15 by the means 17, along with the desired adjustments (signal path 11). The signals K1 and K2 may be constant or may be selected dependent on variables representing or influencing the state of travel.

The mode of operation of this embodiment, specifically the functional mode of the second means 15, will now be illustrated in greater detail with the aid of the flow chart in FIG. 3. Following the start 30, the thresholds K1 and K2 are read in at a first step 31. The following step 32 starts the query whether an adjustment of the damping characteristic is desired. This is the case whenever the two-stage signal Zh/Zw (signal path 11) changes its value. If no adjustment is desired, with no change of the signal Zh/Zw occurring, no activations of the shock absorber will be carried out. If an adjustment is desired, the signal Xar'(t) of the spring deflection velocity is compared with the first threshold K1 in step 33. If, as in the present embodiment, the traction stage is by convention characterized by positive spring deflection velocities, the query Xar'<K1 is performed in step 33. If the spring deflection velocity exceeds the first threshold, no changeover will be effected. However, if the spring deflection velocity falls short of the first threshold, a second query takes place in step 34. Here, the spring deflection acceleration is compared with a second threshold K2. According to the mathematical sign convention in the present embodiment, a changeover of the damping characteristic will take place whenever the spring deflection acceleration falls short of the second threshold. If the spring deflection acceleration exceeds the second threshold, no changeover is carried out. Step 35 represents the changeover. It can be effected by closing the controllable switch 13, while its open position results in retaining the damping characteristic that is presently effective.

The thresholds K1 and K2 are selected independent of variables which represent and/or influence the state of travel. Furthermore, the thresholds K1 and K2 can be selected as tuning parameters as regards the minimization of switching noises in changing the damping characteristics.

The signals Xar'(t) may be captured by sensors for acquisition of the spring deflection movements, such as the spring deflection travel and/or the spring deflection velocity. The signals Xar'(t) of these sensors may be appropriately processed, prior to differentiation in first means 14, for instance by filters with a high-pass or low-pass type transfer performance.

Moreover, in one possible embodiment of the inventional system the signals Xar"(t) may be captured by sensors. The first means 14 for differentiation are then not necessary.

Especially favorable is the use of a shock absorber so designed that its damping characteristic is adjustable only when the two ends of the shock absorber move away from each other (traction stage). A possible development of such a shock absorber will be described hereinbelow.

To that end, FIG. 4 illustrates a shock absorber where at least two chambers for a fluid are interconnected by valves and at least one valve is fashioned as an adjustable choking point which is contingent on the direction of flow.

The shock absorber features an outer shell tube 42 in which an inner shell tube 43 is concentrically fastened. The outer shell tube 42 is endwise terminated by the first bottom 44 and the inner shell tube 43 by the second bottom 48. Choking points III and IV are disposed in the second bottom 48, near the first bottom 44, through which an exchange of fluid from the annular space C formed by the shell tubes 42 and 43 to the interior space formed in the shell tube 43 is possible. The outer shell tube 42 is sealed by a lid 45 and the inner shell tube by a lid 46. The lids 45 and 46 possess central piston rod conduits through which extends a piston rod 41, within which the shock absorber extends into a damping piston 47. The latter subdivides the interior of the inner shell tube 43 into an upper working chamber A and a lower working chamber B, where an exchange of fluid between the working chambers A and B is possible by way of the choking points I and II in the piston 47. Concerned is thus a known dual-tube shock absorber (J. Reimpell, Fahrwerktechnik: Stoßdämpfer [Undercarriage Engineering: Shock Absorbers], Vogel-Buchverlag, Würzburg).

As the wheels settle (compression stage), the shock absorber is being shortened, the piston 47 descends and part of the fluid flows from the lower working chamber B through the choking points I fashioned as a valve into the upper working chamber A. The fluid quantity corresponding to the plunging piston rod volume is forced into the annular space C, and through the choking point III fashioned as a valve contained in the second bottom 48. No fluid flow is taking place through the choking points II and IV fashioned as check valves.

As the wheels are extended (traction stage), the ascending piston 47 produces a pressure in the upper working chamber A forcing the fluid through the choking point II, fashioned as a valve, into the lower working chamber B. Extending the piston rod 41 results in a fluid shortage in the working space B, and this amount of shortage is replenished from the working chamber C, through the choking point IV fashioned as a valve. No fluid flow is taking place through the choking points I and III fashioned as check valves.

The valve IV is a simple check valve, the valves I and III are designed as spring-loaded check valves. The valve II is a check valve with an adjustable cross section. Since a fluid flow through the valve II takes place only in the traction stage, various damping characteristics can be adjusted in the traction stage by changing the cross section of the valve II. In the compression stage, the latter is closed; that is no change of the damping characteristic is achievable in the compression stage.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A system for undercarriage control of a vehicle, comprising:
    an adjustable damper including at least one adjustable damping valve for adjustment of a damping characteristic of the damper in at least two modes, said damper defining a tension and compression stage, said damper having a difference in damping force between two of said damping characteristic modes in one of said tension and compression stages, which is smaller than a difference in damping force between two of said damping characteristic modes in the other of said tension and compression stages; and means for actuating the damping valve, said actuation only occurring during one of said tension and compression stages having said smaller difference in damping force.

2. The system according to claim 1, wherein said actuating means is dependent upon relative movements of opposite ends of said damper.

3. The system according to claim 2, wherein said opposite ends of said damper exhibit at least one of a relative velocity and a relative acceleration, the relative velocity between said opposite ends captured by signals (Xar'(t)) as relative movements of said opposite ends, and the relative acceleration between said opposite ends captured by signals (Xar"(t)) as relative movements of said opposite ends.

4. The system according to claim 3, further comprising sensors in communication with said actuating means, said sensors providing output signals representing spring deflection movements, the spring deflection movements corresponding to at least one of spring deflection travel, spring deflection velocity, and fluid pressure within said damper.

5. The system according to claim 1, wherein said damper is configured whereby said damping characteristic is only adjustable as opposing ends of said damper move away from each other.

6. The system according to claim 5, wherein said damper is configured as a dual-tube shock absorber having at least two chambers for a fluid, the two chambers interconnected by valves, at least one of said valves adjustable and configured as a choking point dependent on a direction of flow.

7. The system according to claim 6, wherein said damper comprises:
- an outer shell tube having a first bottom and defining an interior space therein;
- an inner shell tube concentrically disposed within the outer shell tube, the inner shell tube having a second bottom;
- an annular space defined between the inner and outer shell tubes;
- at least one choking point disposed in the second bottom, preferably near the first bottom, the choking point enabling an exchange of fluid from the annular space into the interior space;
- a first lid in sealing engagement with the outer shell tube, the first lid having a first opening therein;
- a second lid in sealing engagement with the inner shell tube, the second lid having a second opening therein;
- a piston rod extending through the first and second shell tubes; and
- a damping piston disposed within the inner shell tube and connected to the piston rod, the damping piston defining an upper working chamber and a lower working chamber, whereby an exchange of fluid takes place between the working chambers via the choking point;
- wherein the choking points are fashioned as check valves, with one of the valves in the piston having an adjustable cross section.

8. The system according to claim 5, wherein said damper comprises:
- an outer shell tube having a first bottom and defining an interior space therein;
- an inner shell tube concentrically disposed within the outer shell tube, the inner shell tube having a second bottom;
- an annular space defined between the inner and outer shell tubes;
- at least one choking point disposed in the second bottom, preferably near the first bottom, the choking point enabling an exchange of fluid from the annular space into the interior space;
- a first lid in sealing engagement with the outer shell tube, the first lid having a first opening therein;
- a second lid in sealing engagement with the inner shell tube, the second lid having a second opening therein;
- a piston rod extending through the first and second shell tubes; and
- a damping piston disposed within the inner shell tube and connected to the piston rod, the damping piston defining an upper working chamber and a lower working chamber, whereby an exchange of fluid takes place between the working chambers via the choking point;
- wherein the choking points are fashioned as check valves, with one of the valves in the piston having an adjustable cross section.

9. The system according to claim 1, wherein said damper is configured whereby said damping characteristic is only adjustable as opposing ends of said damper move toward each other.

10. The system according to claim 9, wherein said damper is configured as a dual-tube shock absorber having at least two chambers for a fluid, the two chambers interconnected by valves, at least one of said valves adjustable and configured as a choking point dependent on a direction of flow.

11. The system according to claim 9, wherein said damper comprises:
- an outer shell tube having a first bottom and defining an interior space therein;
- an inner shell tube concentrically disposed within the outer shell tube, the inner shell tube having a second bottom;
- an annular space defined between the inner and outer shell tubes;
- at least one choking point disposed in the second bottom, preferably near the first bottom, the choking point enabling an exchange of fluid from the annular space into the interior space;
- a first lid in sealing engagement with the outer shell tube, the first lid having a first opening therein;
- a second lid in sealing engagement with the inner shell tube, the second lid having a second opening therein;
- a piston rod extending through the first and second shell tubes; and
- a damping piston disposed within the inner shell tube and connected to the piston rod, the damping piston defining an upper working chamber and a lower working chamber, whereby an exchange of fluid takes place between the working chambers via the choking point;
- wherein the choking points are fashioned as check valves, with one of the valves in the piston having an adjustable cross section.

12. A method of actuating an adjustable damper in a vehicle, the damper including at least one adjustable damping valve for adjustment of a damping characteristic of the damper in at least two modes, the damper defining a tension and compression stage, said method comprising the steps of:

actuating the damping valve dependent on whether the damper is in a tension or compression stage;

the improvement comprising:

actuating the damping valve only during one of said tension and compression stages having a difference in damping force between two of said damping characteristic modes which is smaller than a difference in damping force between two of said damping characteristic modes in the other of said tension and compression stages.

13. The method of claim 12, comprising the further steps of:

selecting first and second threshold values, said first and second threshold values representing one of a constant and a variable, said variable at least one of representing and influencing a variable of state of the vehicle;

said actuating step further dependent on at least one comparison of:

a first signal representing a spring deflection velocity with said first threshold value, and a second signal representing a spring deflection acceleration with said second threshold value.

14. The method of claim 13, wherein at least one of said first and second threshold values represents tuning parameters used for minimization of switching noises which occur as a result of said actuating step.

15. The method of claim 13, wherein the vehicle includes a body and at least one wheel unit, said damper connected at one end thereof to the vehicle body, and connected at the other end thereof to a said wheel unit, comprising the further steps of:

sensing a relative movement between the vehicle body and the wheel unit;

providing a signal representing said sensed relative movement; and utilizing said signal representing said sensed relative movement for said actuating step.

16. The method of claim 15, wherein said sensing step comprises sensing a relative velocity between the vehicle body and the wheel unit.

17. The method of claim 15, wherein said sensing step comprises sensing a relative acceleration between the vehicle body and the wheel unit.

* * * * *